United States Patent
Tao et al.

(10) Patent No.: US 8,538,441 B2
(45) Date of Patent: Sep. 17, 2013

(54) METHOD AND SYSTEM FOR IMPLEMENTING THE LOCAL SWITCH OF THE LOCAL CALL

(75) Inventors: Quanjun Tao, Shenzhen (CN); Zhenhua Xie, Shenzhen (CN); Jing Li, Shenzhen (CN)

(73) Assignee: ZTE Corporation, Shenzhen, Guangdon Province (CN)

( * ) Notice: Subject to any disclaimer, the term of this patent is extended or adjusted under 35 U.S.C. 154(b) by 0 days.

(21) Appl. No.: 13/257,715

(22) PCT Filed: Dec. 25, 2009

(86) PCT No.: PCT/CN2009/076089
§ 371 (c)(1),
(2), (4) Date: Jan. 17, 2012

(87) PCT Pub. No.: WO2011/017894
PCT Pub. Date: Feb. 17, 2011

(65) Prior Publication Data
US 2012/0129538 A1 May 24, 2012

(30) Foreign Application Priority Data
Aug. 12, 2009 (CN) .......................... 2009 1 0167321

(51) Int. Cl.
*H04W 40/00* (2009.01)

(52) U.S. Cl.
USPC ....................................................... 455/445

(58) Field of Classification Search
USPC .................. 455/422.1, 428, 517, 418, 404.1,
455/436, 445, 415, 574; 370/353, 352, 331,
370/337, 341
See application file for complete search history.

(56) References Cited

U.S. PATENT DOCUMENTS

| | | | |
|---|---|---|---|
| 2003/0148774 A1* | 8/2003 | Naghian et al. | 455/456 |
| 2006/0019658 A1* | 1/2006 | Gallagher et al. | 455/426.1 |
| 2006/0280167 A1* | 12/2006 | Pelous et al. | 370/352 |
| 2008/0064385 A1* | 3/2008 | den Hartog et al. | 455/422.1 |
| 2008/0310404 A1* | 12/2008 | Valme et al. | 370/353 |

FOREIGN PATENT DOCUMENTS

| | | |
|---|---|---|
| CN | 1889760 A | 1/2007 |
| CN | 101185299 A | 5/2008 |
| CN | 101272626 A | 9/2008 |
| CN | 101431812 A | 5/2009 |
| WO | 2008133558 A1 | 11/2008 |
| WO | 2009/088326 A1 | 7/2009 |

* cited by examiner

*Primary Examiner* — Kiet Doan
(74) *Attorney, Agent, or Firm* — McClure, Qualey & Rodack, LLP (57) ABSTRACT

The present invention provides a method for implementing local call local switch, including: a calling side MSC receiving a call setup request from a calling user, the calling side MSC and a called side MSC mutually transferring the access information of the calling user and the called user; the calling side MSC or the called side MSC judging whether a local switch can be triggered according to the access information of the opposite end user; when judging that a local switch can be triggered, the calling side MSC or the called side MSC informing BSS to implement the local switch. The present invention further provides a system for implementing local call local switch, which includes a MSC and a BSS, to provide the support to implementing local call local switch.

16 Claims, 6 Drawing Sheets

METHOD AND SYSTEM FOR IMPLEMENTING THE LOCAL SWITCH OF THE LOCAL CALL

CROSS REFERENCE RELATED APPLICATIONS

This application is a national phase of PCT/CN2009/076089 filed Dec. 25, 2009, which claims priority to China Application Serial No. 200910167321.X, filed Aug. 12, 2009, both of which are entirely incorporated herein by reference.

TECHNICAL FIELD

The present invention relates to communication field, and more specifically, to a method and system for implementing Local Call Local Switch (LCLS) in circuit domain.

BACKGROUND OF THE RELATED ART

Mobile network, such as GSM (Global System for Mobile communications) and UMTS (Universal Mobile Telecommunications System) and so on, adopting the circuit switched technique is called as Circuit Switched (CS) domain, which can provide basic voice services and supplementary services based on voice services for users.

In some parts of the world, such as Africa, South America and South Asia and so on, the lack of fast and reliable transmission resources or the presence of high transmission costs bring certain difficulties to the operators in implementing the deployment of network and service. However, the majority of calls in mobile network are local calls according to statistics in those places, which are generated in the same Base Station System (BSS). If a local switch technique (the voice data performing loop in BSS) is adopted in local calls, it can save the transmission resources of A port between a BSS and a core network MSC (Mobile Switch Center).

Figure 1:
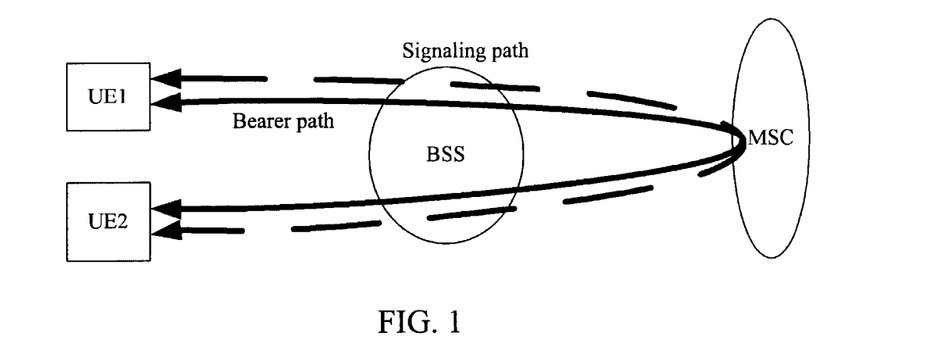
FIG. 1 is a schematic diagram of the traditional voice call.

FIG. 1 is a schematic diagram of the traditional voice call, the User Equipment (UE) accesses BSS and MSC through CS domain. When UE1 calls UE2, UE1 sends a call setup request to the MSC to which the UE1 is accessed through the BSS; the MSC finds the called UE2 according to the location information of access of UE2 and informs the BSS to set up a radio bearer connected with the UE1 and UE2 and respectively sets up a bearer of the UE1 and UE2 between the BSS and MSC; and loop is performed on the bearer of both sides of MSC, which ensures a voice communication between the UE1 and UE2.

Figure 2:
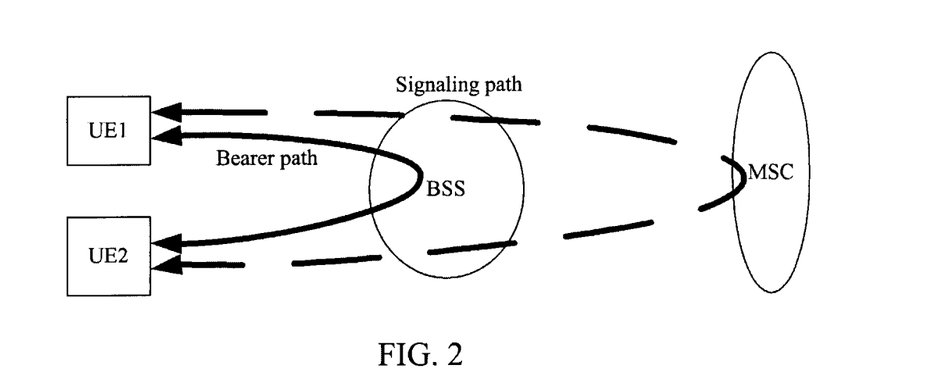
FIG. 2 is a schematic diagram of a voice call adopting a local call local switch technique.

FIG. 2 is a schematic diagram of a voice call adopting the local call local switch technique, and compared with FIG. 1, the MSC judges whether the UE1 and UE2 belong to the same one BSS according to the cell when receiving a call setup request from the UE1, if the UE1 and UE2 belong to the same one BSS, the MSC informs the BSS to implement a local switch; the bearer loop of the UE1 and UE2 is implemented at the side of BSS, which can save the bearing resource between the BSS and MSC, that is the bearing resource of A port.

Figure 3:
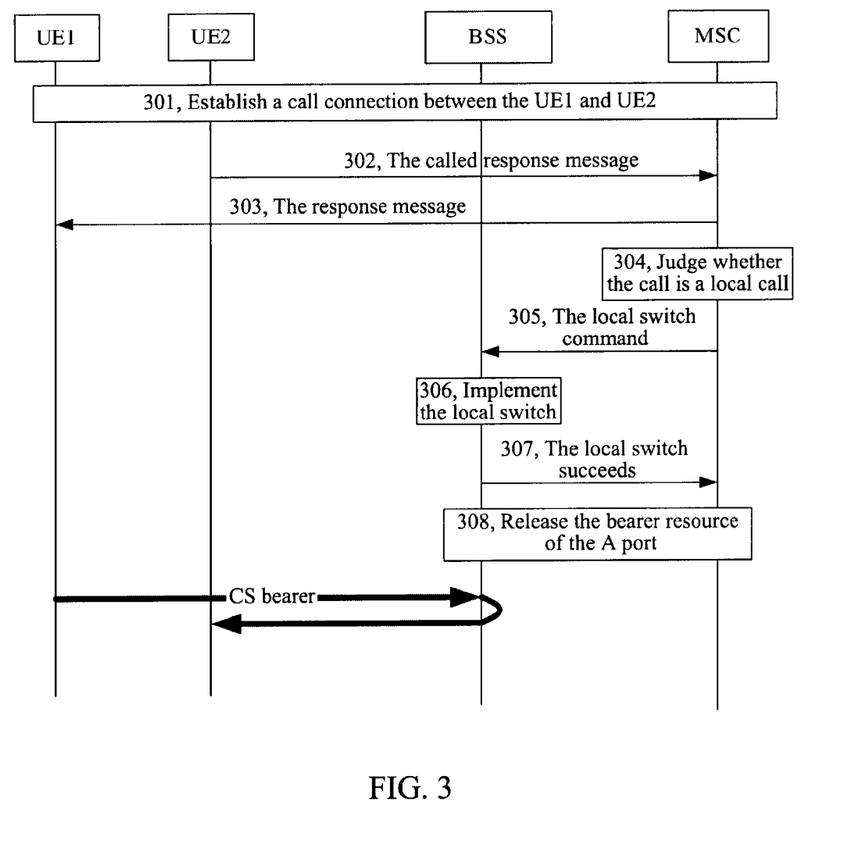
FIG. 3 is a signaling flow chart of the local switch technique adopted in FIG. 2.

FIG. 3 is a signaling flow of the local call local switch technique adopted in FIG. 2, comprising following steps:

301, the UE1 and UE2 initiate calls under the same BSS, and set up a mutual connection through a core network MSC, and the MSC allocates a circuit number or a call identifier between the BSS and MSC to the calling UE1 and the called UE2;

302, the called UE2 responds in a ringing status, and sends a called response message to MSC through BSS;

303, the MSC sends the called response message to the calling UE1, and informs the UE1 that the call is connected;

304, the MSC judges whether the call is a local call belonging to the same one BSS according to the current location information of the calling UE1 and the called UE2;

305, if the call is a local call belonging to the same one BSS, the MSC sends a local switch command message to the BSS and informs the BSS to implement a local switch, and the local switch command message includes the circuit number or call identifier between the BSS and MSC which are allocated by the MSC to the calling UE1 and the called UE2 in the step 301;

306, the BSS receives the local switch command message, and associates the local switch command message with two ongoing communication conversations according to the circuit number or the call identifier of the calling and the called in the local switch command message, and performs loop on the voice data bearer thereof so as to implement the switch of voice bearer in the BSS;

307, the BSS sends a local switch success message to the MSC after the local switch succeeds; and 308, the MSC informs the BSS to release the voice bearer connection between the BSS and MSC after receiving the local switch success message, that is, release the bearer connection of the A port.

Figure 4:
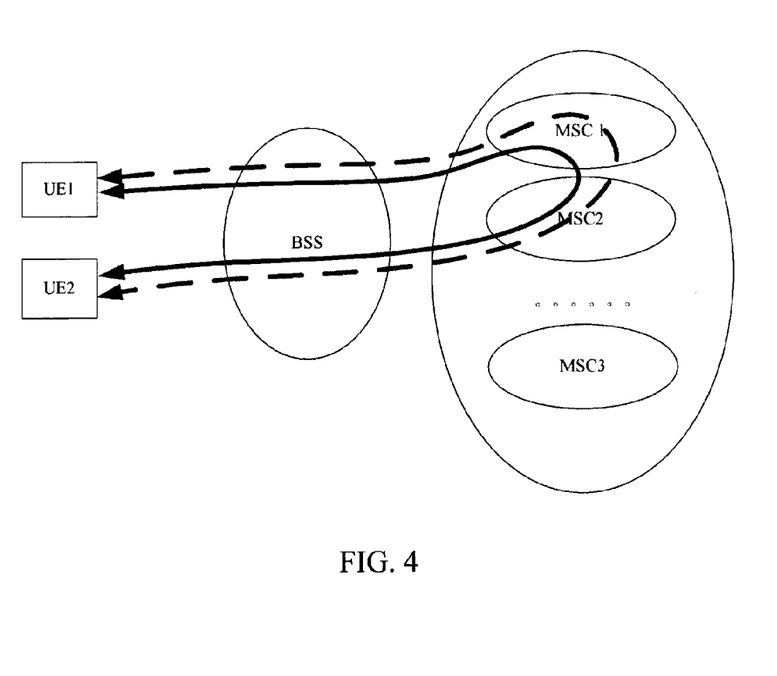
FIG. 4 is a schematic diagram in a scenario of the BSS connecting with multiple MSCs.

Regarding to the analysis of the above steps, if in a scenario of the BSS connecting with multiple MSCs shown in FIG. 4, the calling UE1 accesses the MSC1 through the BSS and the called UE2 accesses the MSC2 through the BSS, although the calling and the called initiate calls under the same BSS, the calling and the called are respectively accessed to different MSCs, which will lead to a problem that neither the MSC1 to which the calling UE1 is accessed nor the MSC2 to which the called UE2 is accessed can judge whether the call is a local call according to the location information of the calling and the called in the step 304, and ultimately lead to a problem that the local call can't implement a local switch.

SUMMARY OF THE INVENTION

The purpose of the present invention is to provide a method and system for implementing local call local switch to solve the problem of an unsuccessful local switch which is caused by the BSS connecting with multiple MSCs.

In order to solve the foregoing technical problem, the present invention provides a method for implementing local call local switch, the method comprises:

a calling side MSC receiving a call setup request from a calling user, the calling side MSC and a called side MSC mutually transferring access information of the calling user and the called user;

the calling side MSC or the called side MSC judging whether a local switch can be triggered according to the access information of opposite end user; and when that the local switch can be triggered is judged, the calling side MSC or the called side MSC informing BSS to implement the local switch.

Furthermore, in the above method, in the step of the calling side MSC and the called side MSC mutually transferring the access information of the calling user and the called user, the calling side MSC and the called side MSC mutually transfer the access information when a user is judged to satisfy a local switch condition; or the calling side MSC and the called side MSC unconditionally transfer the access information, wherein the access information includes a support local switch indication of the user.

Furthermore, in the above method, the access information comprises:

location information of the calling user or the called user when setting up a call;

bearer circuit information or a call identifier of the user, wherein, the call identifier refers to an identifier which is used for associating a call connection between the calling side MSC and the calling side BSS or between the called side MSC and the called side BSS, and the bearer circuit information refers to a bearer physical connection which is used to identify the calling side MSC and the calling side BSS or the called side MSC and the called side BSS for call distribution; and the support local switch indication of the user, wherein, the support local switch indication refers to the calling side MSC and the called side MSC indicating whether the calling user or the called user satisfies the local switch condition.

Furthermore, in the above method, the user satisfying the local switch condition refers that the user currently has no conversations of communicating with other users, and complies with a local switch user management policy of operators.

Furthermore, in the above method, in the step of the calling side MSC and the called side MSC mutually transferring the access information, the calling side MSC and the called side MSC are the same MSC or different MSCs.

Furthermore, in the above method, if the calling side MSC and the called side MSC are the same MSC, the step of the calling side MSC and the called side MSC mutually transferring the access information of the calling user and the called user is that:

the calling side MSC and the called side MSC transferring the access information internally;

or, if the calling side MSC and the called side MSC are different MSCs, the step of the calling side MSC and the called side MSC mutually transferring the access information of the calling user and the called user is that:

the calling side MSC and the called side MSC transferring the access information through an ISUP/BICC signaling or a MAP notification message.

Furthermore, in the above method, if the user is judged to satisfy the local switch condition, the calling side MSC and the called side MSC mutually transfer the access information, and the step of the calling side MSC or the called side MSC judging whether a local switch can be triggered according to the access information of the opposite end user comprises:

the calling side MSC or the called side MSC judging whether the location information in the access information of the opposite end user and location information on where this end user is located belonging to the same one BSS; and if the location information is judged to belong to the same one BSS and this end user satisfies the local switch condition according to claim 4, the calling side MSC or the called side MSC being judged to be able to trigger the local switch;

or, if the calling side MSC and the called side MSC unconditionally transfer the access information, the step of the calling side MSC or the called side MSC judging whether a local switch can be triggered according to the access information of the opposite end user comprises:

the calling side MSC or the called side MSC judging whether the location information in the access information of the opposite end user and the location information on where the home end user is located belonging to the same one BSS; and if the location information is judged to belong to the same one BSS and the access information of the opposite end user includes the support local switch indication of user which indicates that the user satisfies the local switch condition, and this end user satisfies the local switch condition, the calling side MSC or the called side MSC being judged to be able to trigger the local switch.

Furthermore, in the above method, the step of the calling side MSC or the called side MSC informing BSS to implement the local switch comprises:

the calling side MSC or the called side MSC transferring the bearer circuit information or call identifier of the opposite end user to the BSS through a terrestrial circuit assignment message, the BSS associating the call connection of both sides according to the received bearer circuit information or call identifier of the user, implementing the local switch, and performing loop on the voice bearer of both sides;

or, the calling side MSC or the called side MSC sending a local switch command to the BSS after receiving a response message of the called user, wherein the local switch command carries the bearer circuit information or call identifier of the calling user and the called user; and the BSS associating the call connection of both sides according to the bearer circuit information or call identifier of the calling user and the called user after receiving the local switch command, implementing the local switch, and performing loop on the voice bearer of both sides.

Furthermore, in the above method, after the step of the BSS implementing the local switch, the method further comprises:

the BSS returning an implementation result to one side of the calling side MSC and the called side MSC, then the MSC which receives the implementation result forwarding the implementation result to the other side of the calling side MSC and the called side MSC; or the BSS returning the implementation result to the calling side MSC and the called side MSC.

Furthermore, in the above method, after the step of the calling side MSC and the called side MSC receiving the implementation result, the method further comprises:

the calling side MSC releasing a bearer terrestrial circuit between the calling side MSC and the BSS; and the called side MSC releasing a bearer terrestrial circuit between the called side MSC and the BSS.

The present invention further provides a system for implementing local call local switch, which comprises a Mobile Switch Center (MSC) and a Base Station System (BSS), wherein, the MSC includes a MSC calling processing module and a MSC called processing module, wherein, the MSC calling processing module is configured to:

receive a call setup request of a calling user; and transfer access information of the calling user and a called user mutually with the called side MSC or the MSC called processing module;

judge whether a local switch can be triggered according to the access information of the called user when the calling side MSC determines whether the local switch is implemented, and inform the calling side BSS to implement the local switch when the local switch is judged to be triggered;

the MSC called processing module is configured to:

transfer the access information of the calling user and the called user mutually with the calling side MSC or with the MSC calling processing module; and judge whether the local switch can be triggered according to the access information of the calling user when the called side MSC determines whether the local switch is implemented, and inform the called side BSS to implement the local switch when the local switch is judged to be triggered;

the BSS includes a BSS calling processing module and a BSS called processing module, wherein, the BSS calling processing module is configured to: implement the local switch according to a notification of the calling side MSC; or the BSS called processing module is configured to: implement the local switch according to a notification of the called side MSC.

Furthermore, in the above system, the MSC calling processing module is further configured to: judge whether the calling user satisfies a local switch condition;

the MSC called processing module is further configured to: judge whether the called user satisfies the local switch condition;

wherein, the satisfying local switch condition refers that a user currently has no conversations of communicating with other users, and complies with a local switch user management policy of operators.

Furthermore, in the above system, when the calling side MSC and the called side MSC are different, the MSC calling processing module transfers the access information with the called side MSC through an ISUP/BICC signaling or a MAP notification message; or, the MSC called processing module transfers the access information with the calling side MSC through the ISUP/BICC signaling or the MAP notification message.

Furthermore, in the above system, the MSC calling processing module is further configured to: judge whether the location information in the access information of the called user and the location information on where the calling user is located belong to the same one BSS, if the location information is judged to belong to the same one BSS and the calling user satisfies the local switch condition, or if the location information is judged to belong to the same BSS and the access information of the called user includes a support local switch indication of user, and the calling user satisfies the local switch condition, then judge that the local switch can be triggered;

or, the MSC called processing module is further configured to: judge whether the location information in the access information of the calling user and the location information on where the called user is located belong to the same one BSS, if the location information is judged to belong to the same one BSS and the called user satisfies the local switch condition, or if the location information is judged to belong to the same one BSS, the access information of the calling user includes the support local switch indication of user, and the called user satisfies the local switch condition, then judge that the local switch can be triggered.

Furthermore, in the above system, the MSC calling processing module is further configured to: transfer bearer circuit information or a call identifier of the called user to the calling side BSS through a terrestrial circuit assignment message;

the BSS calling processing module is further configured to: receive the bearer circuit information or call identifier of the user transferred from the called side MSC, associate a call connection of both sides, and perform loop on a voice bearer of both sides;

or, the MSC called processing module is further configured to: transfer the bearer circuit information or call identifier of the calling user to the called side BSS through the terrestrial circuit assignment message;

the BSS called processing module is further configured to: receive the bearer circuit information or call identifier of the user transferred by the calling side MSC, associate the call connection of both sides, and perform loop on the voice bearer of both sides.

Furthermore, in the above system, the MSC calling processing module is further configured to: send the local switch command to the calling side BSS after receiving a response message of the called user transferred by the called side MSC or the MSC called processing module, wherein the local switch command carries the bearer circuit information or call identifier of the calling user and the called user;

the BSS calling processing module is further configured to: receive the local switch command sent by the calling side MSC, associate the call connection of both sides according to the bearer circuit information or call identifier of the calling user and the called user which is carried in the local switch command, and perform loop on the voice bearer of both sides;

or the MSC called processing module is further configured to: transfer the response message to the MSC calling processing module after receiving the response message of the called user; or send a local switch command to the called side BSS after receiving the response message of the called user; wherein, the local switch command carries the bearer circuit information or call identifier of the calling user and the called user;

the BSS called processing module is further configured to: receive the local switch command sent by the called side MSC, and associate the call connection of both sides according to the bearer circuit information or call identifier of the calling user and the called user which is carried in the local switch command, and perform loop on the voice bearer of both sides.

Furthermore, in the above system, the BSS calling processing module is further configured to: return an implementation result of the local switch to the calling side MSC;

the BSS called processing module is further configured to: return an implementation result of the local switch to the called side MSC;

the MSC calling processing module is further configured to: receive the implementation result returned from the calling side BSS, and forward the implementation result to the MSC called processing module or the called side MSC;

the MSC called processing module is further configured to: receive the implementation result returned from the called side BSS, and forward the implementation result to the MSC calling processing module or the calling side MSC;

wherein, the implementation result includes a local switch completion message or a local switch success message.

Furthermore, in the above system, the MSC calling processing module is further configured to: release a bearer terrestrial circuit between the MSC calling processing module and the calling side BSS after receiving the implementation result;

the MSC called processing module is further configured to: release the bearer terrestrial circuit between the MSC called processing module and the called side BSS after receiving the implementation result.

Compared with the prior art, the method and system for implementing local call local switch provided in the present invention judge a local call through the MSC, and then inform the BSS to implement a local switch, thereby solving the problem of an unsuccessful local switch which is caused by BSS connecting with multiple MSCs.

PREFERRED EMBODIMENT OF THE PRESENT INVENTION

Below the present invention will be further described in detail with reference to drawings and specific examples.

Figure 5:
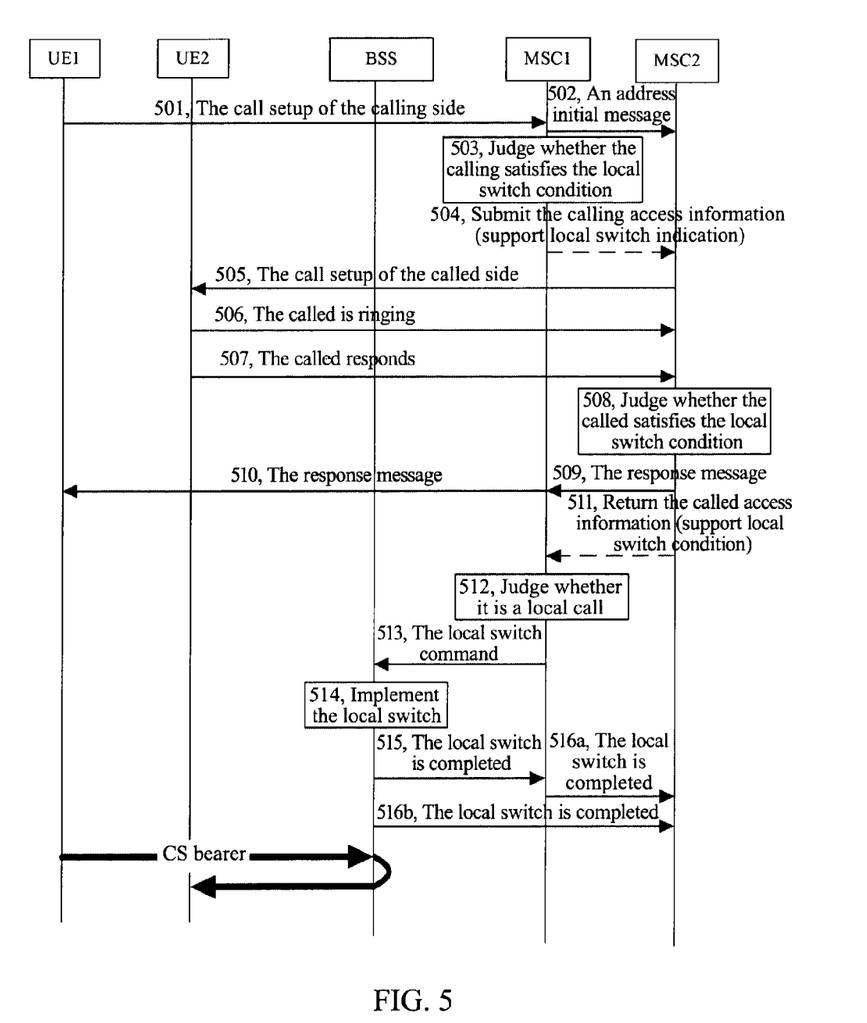
FIG. 5 is a flow chart of the example of the calling side MSC judging a local call when the calling user and the called user are in different MSC scenarios according to the invention.

FIG. 5 is a flow chart of the example of the calling side MSC judging a local call when the calling user and the called user are in different MSC scenarios. In the example, UE1 and UE2 access MSC1 and MSC2 respectively through the same one BSS, and when UE1 calls UE2, MSC1 judges that the UE1 and UE2 are local calls according to the obtained access information of the UE2, and informs BSS to implement a local switch. As shown in FIG. 5, the example comprises the following steps:

501, the UE1 initiates a call setup request to MSC1 through the BSS, and the called in the request message is UE2, and the MSC1 sends an assignment command to the BSS and informs the BSS to assign the terrestrial circuit and air-interface resource;

502, the MSC1 sends an address initial message or a setup interoffice bearer request to the MSC2 according to the number of the called UE2 or the user roaming number which is obtained from the home subscriber server of the UE2;

503, the MSC1 judges whether the UE1 has conversations of communicating with other users currently, and whether the UE1 complies with the local switch user management policy of the operators, and whether the UE1 sets a monitoring point, that is a monitoring service of MSC, and if the UE1 simultaneously satisfies the condition that it has no conversations of communicating with other users currently and complies with the local switch user management policy of the operators and does not set a monitoring point namely a monitoring service of the MSC1, or if UE1 at least satisfies the condition that it has no conversations of communicating with other users currently and complies with the local switch user management policy of the operators, the UE1 satisfies the local switch condition;

504, the MSC1 submits the calling access information to MSC2, wherein the calling access information includes following information:

location information when the calling UE1 setting up a call;

bearer circuit information between MSC1 and BSS or a call identifier associated with the call of MSC1 and BSS in the step 501; and a support local switch indication of user, which is mainly used to indicate whether the calling UE1 satisfies the local switch condition;

the transferring of the calling access information adopts an ISUP/BICC signaling or a MAP notification message;

505, the MSC2 receives the address initial message or the setup interoffice bearer request sent by MSC1 in the step 502, and sends a called setup call request to UE2 according to the called number in the address initial message, or the obtained called number according to the roaming number, or the called number in the setup interoffice bearer request;

506, the called is ringing;

507, the called responds, and sends a response message to MSC2;

508, the MSC2 judges whether the UE2 satisfies the local switch condition, the method referring to the step 503;

509, the MSC2 sends the response message of UE2 to the MSC1;

510, the MSC1 then informs the response message of UE2 to the UE1;

511, if the UE2 is judged to satisfy the local switch condition in the step 508, the MSC2 returns the access information of UE2 to MSC1, wherein the contents of the access information of UE2 are the same as the contents of the calling access information in the step 504, which are specifically as follows:

location information when the called UE2 setting up a call;

bearer circuit information between MSC2 and BSS or a call identifier associated with the call of MSC2 and BSS; and a support local switch indication of user, which is mainly used to indicate whether the called UE2 satisfies the local switch condition;

512, the MSC1 judges whether the UE1 and UE2 belong to the same one BSS according to the location information in the access information of the UE2, that is, judges whether the call is a local call, and judges whether both UE1 and UE2 satisfy the local switch condition;

513, if the step 512 judges that both the UE1 and UE2 satisfy the local switch condition, the MSC1 sends a local switch command message to BSS, wherein the local switch command message includes the bearer circuit information or call identifier in the access information of UE1 and UE2;

514, the BSS associates the call connection of both sides according to the bearer circuit information or the call identifier of UE1 and UE2 after receiving the local switch command message of MSC1, and makes the bearer circuit of the calling side and the called side perform loop in the BSS, that is implements the local switch;

515, the BSS sends a local switch completion message to the MSC1 after the implementation of local switch is completed, and informs the MSC1 that the local switch has been completed, and the MSC1 releases the bearer terrestrial circuit between the MSC1 and BSS;

516a, the MSC1 forwards the local switch completion message to MSC2 after receiving a local switch completion message, and informs the MSC2 that the local switch has succeeded, and the MSC2 releases the bearer terrestrial circuit between the MSC2 and BSS after receiving the local switch completion message; or 516b, the BSS sends a local switch success message to the MSC2 and informs the MSC2 that the local switch has succeeded, and the MSC2 releases the bearer terrestrial circuit between the MSC2 and BSS after receiving the local switch success message.

In other examples, the MSC1 can transfer the calling access information to the MSC2 when the MSC1 judges that the calling UE1 satisfies the local switch condition in the step 504.

In other examples, the step 508 can be prior to the steps 506~507.

In other examples, the step 511 can be prior to the step 509 and can also be included in the response message parameters of the step 509.

In other examples, the steps 513~514 can also be:

the MSC1 transfers the bearer circuit information or call identifier of the opposite end user to BSS through a terrestrial circuit assignment message, and the BSS associates the call connection of both sides according to the received bearer circuit information or call identifier of the user, implements the local switch, and performs loop on the voice bearer of both sides.

Figure 6:
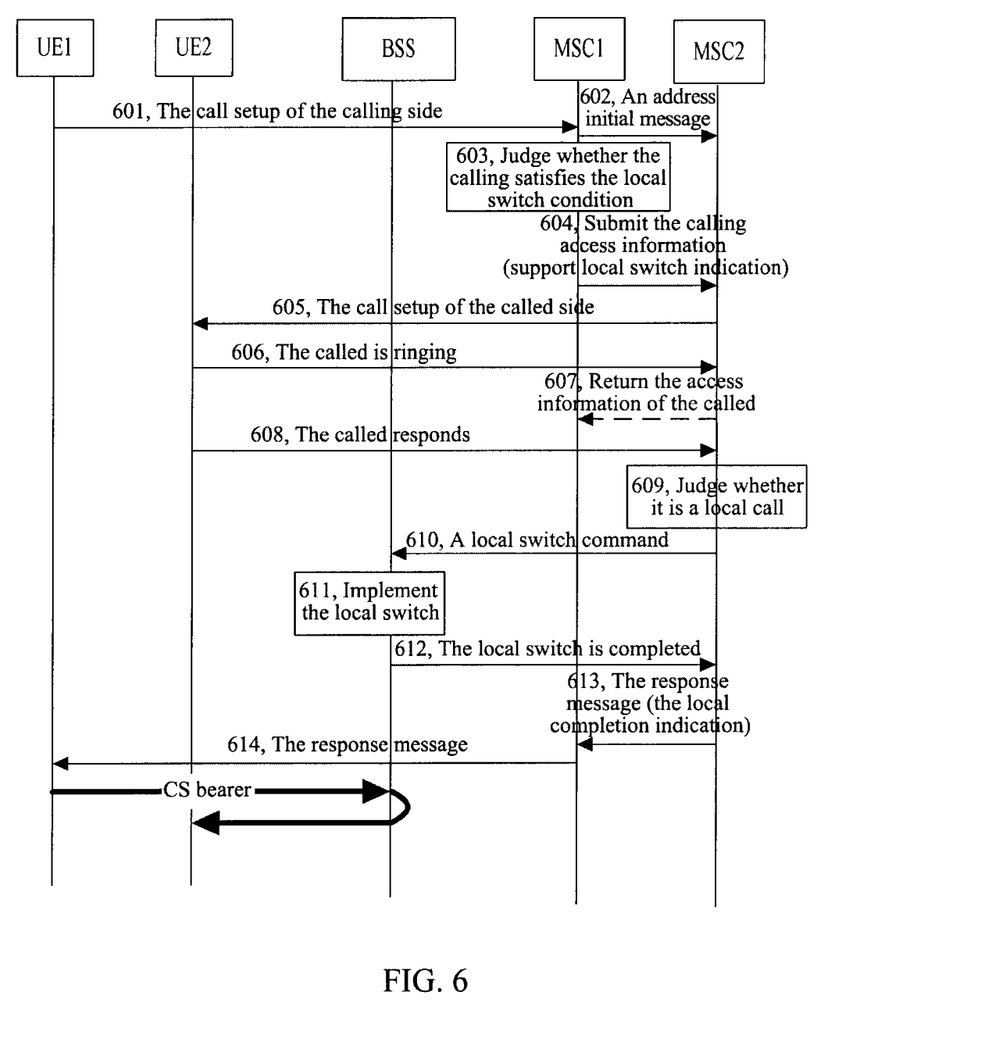
FIG. 6 is a flow chart of the example of the called side MSC judging a local call when the calling user and the called user are in different scenarios according to the invention.

FIG. 6 is a flow chart of the example of the called side MSC judging a local call when the calling user and the called user are in different MSC scenarios. In the example, UE1 and UE2 access MSC1 and MSC2 respectively through the same one BSS, and when UE1 calls UE2, the MSC2 judges that UE1 and UE2 are local calls according to the obtained access information of UE1, and informs BSS to implement a local switch. As shown in FIG. 6, the example comprises following steps:

the steps 601~606 are the same as the steps 501~506, which will not be described repeatedly here;

607, the MSC2 judges whether the UE2 satisfies the local switch condition, if UE2 satisfies the local switch condition, the MSC2 returns the access information of the UE2 to MSC1, and the contents of the access information returned from MSC2 are the same as the contents of the step 504;

608, the MSC2 receives a called response message of UE2;

609, the MSC2 judges UE1 and UE2 belong to the same one BSS according to the location information in the access information of the calling UE1, that is the call is a local call, and both UE1 and UE2 satisfy the local switch condition;

610, the MSC2 sends a local switch command message to the BSS, wherein the local switch command message includes the bearer circuit information or call identifier in the access information of the UE1 and UE2;

611, the BSS implements a local switch after receiving the local switch command message of MSC2, referring to 514;

612, the BSS informs the MSC2 after successfully implementing the local switch and sends a local switch completion message to the MSC2, and the MSC2 releases the bearer terrestrial circuit between the MSC2 and BSS;

613, the MSC2 returns a response message to the MSC1, and the message includes a local switch completion indication; and

614, the MSC1 receives the response message and judges a local switch completion indication is included in said message, and releases the bearer terrestrial circuit between the MSC1 and BSS and informs the opposite terminal of the UE1 to respond.

In other examples, the steps 610~611 can also be:

the MSC2 transfers the bearer circuit information or call identifier of the opposite end user to the BSS through a terrestrial circuit assignment message, and the BSS associates the call connection of both sides according to the received bearer circuit information or call identifier of the user and implements the local switch and performs loop on the voice bearer of both sides.

Figure 7:
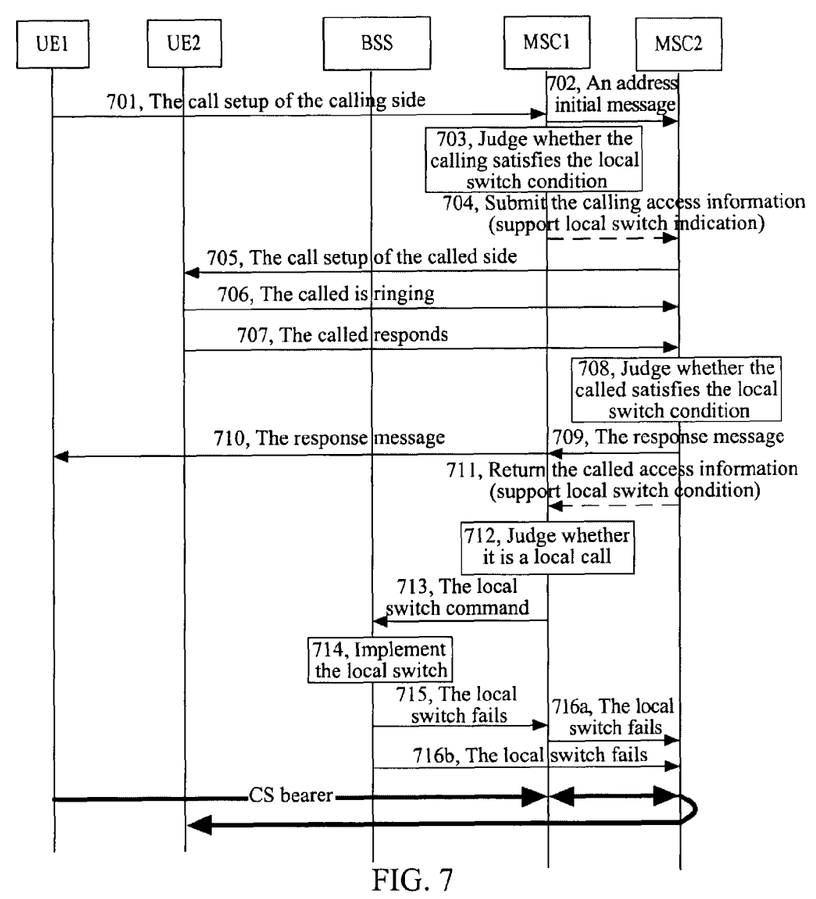
FIG. 7 is a flow chart of the example of the BSS implementing an unsuccessful local switch according to the invention.

FIG. 7 is a flow chart of the example of the BSS implementing an unsuccessful local switch. As shown in FIG. 7, the example comprises the following steps:

the steps 701~714 are the same as the steps 501~514, which will not be described repeatedly here;

715, after the implementation of local switch fails, the BSS sends a local switch failure message to the MSC1 and informs the MSC1 that the local switch has failed, and the MSC1 reserves the bearer terrestrial circuit between the MSC1 and BSS;

716a, the MSC1 forwards the local switch failure message to the MSC2 after receiving a local switch failure message and informs the MSC2 the local switch has failed, and the MSC2 reserves the bearer terrestrial circuit between the MSC2 and BSS after receiving the local switch failure message; or

716b, the BSS sends a local switch failure message to the MSC2, and the MSC2 reserves the bearer terrestrial circuit between the MSC2 and BSS after receiving the local switch failure message.

Figure 8:
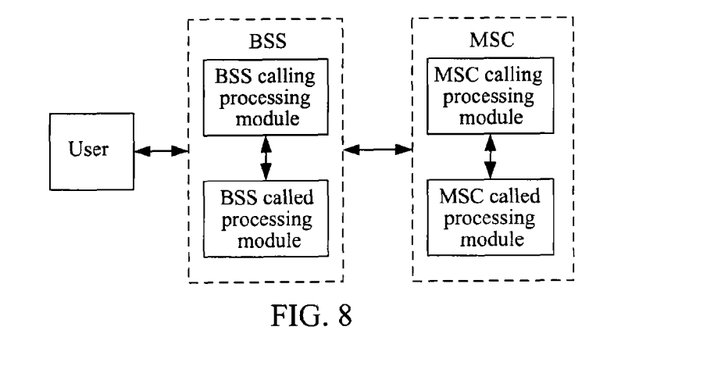
FIG. 8 is a schematic diagram of a system for implementing local call local switch of the invention.

FIG. 8 is a schematic diagram of a system for implementing local call local switch of the invention, and the system comprises a MSC and a BSS, wherein the MSC is in a communication connection with the BSS and can be as a calling side MSC or a called side MSC connected with a calling side BSS or a called side BSS respectively.

The MSC can include a MSC calling processing module and a MSC called processing module, wherein, the MSC calling processing module is used to receive a call setup request from a calling user;

when the calling side MSC and the called side MSC are different, the MSC calling processing module is further used to mutually transfer the access information of the calling user and the called user with the called side MSC; and the MSC called processing module is used to mutually transfer the access information of the calling user and the called user with the calling side MSC; or when the calling side MSC and the called side MSC are the same one MSC, the MSC calling processing module also mutually transfers the access information of the calling user and the called user with the MSC called processing module; and the MSC calling processing module is further used to judge whether a local switch can be triggered according to the access information of the called user, and inform the calling side BSS to implement a local switch when that a local switch can be triggered is judged; or the MSC called processing module is further used to judge whether a local switch can be triggered according to the access information of the calling user, and inform the called side BSS to implement a local switch when that a local switch can be triggered is judged;

the BSS can include a BSS calling processing module and a BSS called processing module, wherein, the BSS calling processing module is used to implement a local switch according to the notification of the calling side MSC; or the BSS called processing module is used to implement a local switch according to the notification of the called side MSC.

Furthermore, the MSC calling processing module and the MSC called processing module are further used to judge whether the calling user and the called user satisfy the local switch condition respectively; when the calling user and the called user respectively satisfy the local switch condition, the MSC calling processing module and the MSC called processing module mutually transfer the access information of the calling user and the called user;

wherein, satisfying the local switch condition refers that the user has no conversations of communicating with other users currently, and complies with the local switch user management policy of the operators.

Furthermore, when the calling side MSC and the called side MSC are different, the MSC calling processing module transfers the access information with the called side MSC through an ISUP/BICC signaling or a MAP notification message; or the MSC called processing module transfers the access information with the calling side MSC through an ISUP/BICC signaling or a MAP notification message.

Furthermore, the MSC calling processing module is further used to judge whether the location information in the access information of the called user and the location information on where the calling user is located belong to the same one BSS, if the location information is judged to belong to the same one BSS and the calling user satisfies the local switch condition, or if the location information is judged to belong to the same one BSS and the access information of the called user includes a support local switch indication of user, and the calling user satisfies the local switch condition, it is judged to be able to trigger the local switch; or the MSC called processing module is further used to judge whether the location information in the access information of the calling user and the location information on where the called user is located belong to the same one BSS, if the location information is judged to belong to the same one BSS and the called user satisfies the local switch condition, or if the location information is judged to belong to the same one BSS and the access information of the calling user includes a support local switch indication of user, and the called user satisfies the local switch condition, it is judged to be able to trigger the local switch.

Furthermore, the MSC calling processing module is further used to transfer the bearer circuit information or call identifier of the called user to the calling side BSS through a terrestrial circuit assignment message;

the BSS calling processing module is further used to receive the bearer circuit information or call identifier of the user transferred by the called side MSC, associate the call connection of both sides, and perform loop on the voice bearer of both sides; or the MSC called processing module is further used to transfer the bearer circuit information or call identifier of the calling user to the called side BSS through a terrestrial circuit assignment message;

the BSS called processing module is further used to receive the bearer circuit information or call identifier of the user transferred by the calling side MSC, associate the call connection of both sides, and perform loop on the voice bearer of both sides.

Furthermore, the MSC calling processing module is further used to send a local switch command to the calling side BSS after receiving a response message of the called user transferred by the called side MSC or the MSC called processing module, wherein the local switch command includes the bearer circuit information or call identifier of the calling user and the called user;

the BSS calling processing module is further used to receive the local switch command sent by the calling side MSC, and associate the call connection of both sides according to the bearer circuit information or call identifier of the calling user and the called user, and perform loop on the voice bearer of both sides; or the MSC called processing module is further used to send a local switch command to the called side BSS after receiving a response message of the called user; wherein the local switch command includes the bearer circuit information or call identifier of the calling user and the called user;

the BSS called processing module is further used to receive the local switch command sent by the called side MSC, and associate the call connection of both sides according to the bearer circuit information or the call identifier of the calling user and the called user, and perform loop on the voice bearer of both sides.

Furthermore, the BSS calling processing module is further used to return an implementation result of the local switch to the calling side MSC;

the BSS called processing module is further used to return an implementation result of the local switch to the called side MSC;

the MSC calling processing module is further used to receive the implementation result returned from the calling side BSS, and forward the implementation result to the MSC called processing module or the called side MSC;

the MSC called processing module is further used to receive the implementation result returned from the called side BSS, and forward the implementation result to the MSC calling processing module or the calling side MSC;

wherein the implementation result includes a local switch completion message or a local switch success message.

Furthermore, the MSC calling processing module is further used to release the bearer terrestrial circuit between the MSC calling processing module and the calling side BSS after receiving the implementation result;

the MSC called processing module is further used to release the bearer terrestrial circuit between the MSC called processing module and the called side BSS after receiving the implementation result.

The method and system for implementing local call local switch provided in the present invention judge a local call through the calling side MSC or the called side MSC, and then inform the BSS to implement a local switch to solve the problem of an unsuccessful local switch which is caused by the BSS connecting with multiple MSCs.

Of course, the present invention can have other various examples, and without departing from the spirit and essence of the present invention, those skilled in the art can make various corresponding changes and transformations according to the present invention, however, all of these corresponding changes and transformations shall fall into the protection scope of the appended claims of the present invention.

INDUSTRIAL APPLICABILITY

The method and system for implementing local call local switch provided in the present invention judge a local call through the MSC and then inform the BSS to implement a local switch to solve the problem of an unsuccessful local switch which is resulted from the BSS connecting with multiple MSCs.

What is claimed is:

1. A method for implementing local call local switch, the method comprising:
   a calling side Mobile Switch Center (MSC) receiving a call setup request from a calling user, the calling side MSC and a called side MSC mutually transferring access information of the calling user and a called user, wherein the access information includes location information of the user when the call is set up;
   the calling side MSC or the called side MSC judging whether the call is a local call in which the calling user and the called user access the same Base Station System (BSS) according to the access information of opposite end user, and judging whether a local switch for looping voice data in the BSS can be triggered; and
   when judging that the local switch can be triggered, the calling side MSC or the called side MSC informing (the BSS-) to implement the local switch;
   wherein the access information further comprises:
   bearer circuit information or a call identifier of user, wherein,
   the call identifier refers to an identifier which is for associating a call connection between the calling side MSC and a calling side BSS or between the called side MSC and a called side BSS, and the bearer circuit information is used to identify a bearer physical connection that is distributed by the calling side MSC and the calling side BSS or the called side MSC and the called side BSS for the call; and
   a support local switch indication of user, wherein,
   the support local switch indication refers to the calling side MSC and the called side MSC indicating whether the calling user or the called user satisfies a local switch condition.

2. The method according to claim 1, wherein, in the step of the calling side MSC and the called side MSC mutually transferring the access information, the calling side MSC and the called side MSC mutually transfer the access information when judging that the user satisfies a local switch condition; or
   the calling side MSC and the called side MSC unconditionally transfer the access information, wherein the access information includes a support local switch indication of the user.

3. The method according to claim 2, wherein the user satisfying the local switch condition refers to the user currently having no conversations of communicating with other users, and complying with a local switch user management policy of operators.

4. The method according to claim 1, wherein,
   the step of the calling side MSC and the called side MSC mutually transferring the access information of the calling user and the called user is that:
   the calling side MSC and the called side MSC transferring the access information through an ISUP/BICC signaling or a MAP notification message.

5. The method according to claim 1, wherein,
   if a user is judged to satisfy a local switch condition, the calling side MSC and the called side MSC mutually transfer the access information, and the step of the calling side MSC or the called side MSC judging whether the local switch can be triggered according to the access information of the opposite end user comprises:
   the calling side MSC or the called side MSC judging whether location information in the access information of the opposite end user and location information on where this end user is located belong to a same one BSS; and
   if the location information is judged to belong to the same one BSS and said this end user satisfies the local switch condition according to claim 4, the calling side MSC or the called side MSC being judged to be able to trigger the local switch;
   or,
   if the calling side MSC and the called side MSC unconditionally transfer the access information, the step of the calling side MSC or the called side MSC judging whether the local switch can be triggered according to the access information of the opposite end user comprises:
   the calling side MSC or the called side MSC judging whether the location information in the access information of the opposite end user and the location information on where said this end user is located belong to the same one BSS; and
   if the location information is judged to belong to the same one BSS and the access information of the opposite end user includes a support local switch indication of user to indicate that the user satisfies the local switch condition, and said this end user satisfies the local switch condition, the calling side MSC or the called side MSC being judged to be able to trigger the local switch.

6. The method according to claim 1, wherein, the step of the calling side MSC or the called side MSC informing BSS to implement the local switch comprises:
   the calling side MSC or the called side MSC transferring bearer circuit information or a call identifier of the opposite end user to the BSS through a terrestrial circuit assignment message, the BSS associating a call connection of both sides according to received bearer circuit information or call identifier of user, implementing the local switch, and performing loop on a voice bearer of both sides;
   or,
   the calling side MSC or the called side MSC sending a local switch command to the BSS after receiving a response message of the called user, wherein the local switch command carries the bearer circuit information or call identifier of the calling user and the called user; and
   the BSS associating the call connection of both sides according to the bearer circuit information or call identifier of the calling user and the called user after receiving the local switch command, implementing the local switch, and performing loop on the voice bearer of both sides.

7. The method according to claim 1, wherein, after the step of the BSS implementing the local switch, the method further comprises:
   the BSS returning an implementation result to one side of the calling side MSC and the called side MSC, then the MSC which receives the implementation result forwarding the implementation result to the other side of the calling side MSC and the called side MSC; or
   the BSS returning the implementation result to the calling side MSC and the called side MSC.

8. The method according to claim 7, wherein, the implementation result includes a local switch completion message or a local switch success message.

9. The method according to claim 8, wherein, after the step of the calling side MSC and the called side MSC receiving the implementation result, the method further comprises:
   the calling side MSC releasing a bearer terrestrial circuit between the calling side MSC and the BSS; and
   the called side MSC releasing a bearer terrestrial circuit between the called side MSC and the BSS.

10. A system for implementing local call local switch, comprising a Mobile Switch Center (MSC) and a Base Station System (BSS), wherein,
the MSC comprises a MSC calling processing module and a MSC called processing module, wherein,
the MSC calling processing module is configured to:
receive a call setup request from a calling user; and
transfer access information of the calling user and a called user with a called side MSC or with the MSC called processing module mutually, wherein the access information includes location information of the user when the call is set up;
judge whether the call is a local call in which the calling user and the called user access the same BSS according to the access information of the called user, and judge whether a local switch for looping voice data in the BSS can be triggered when a calling side MSC determines whether the local switch is implemented,
and inform a calling side BSS to implement the local switch when judging that the local switch can be triggered;
the MSC called processing module is configured to:
transfer the access information of the calling user and the called user with the calling side MSC or with the MSC calling processing module mutually, wherein the access information includes location information of the user when the call is set up; and
judge whether the call is a local call in which the calling user and the called user access the same BSS according to the access information of the calling user, and judge whether the local switch for looping voice data in the BSS can be triggered when the called side MSC determines whether the local switch is implemented, and inform the called side BSS to implement the local switch when judging that the local switch can be triggered;
the BSS comprises a BSS calling processing module and a BSS called processing module, wherein,
the BSS calling processing module is configured to: implement the local switch according to a notification of the calling side MSC; or
the BSS called processing module is configured to: implement the local switch according to a notification of the called side MSC;
wherein, the MSC calling processing module is further configured to: transfer bearer circuit information or a call identifier of the called user to the calling side BSS through a terrestrial circuit assignment message;
the BSS calling processing module is further configured to: receive the bearer circuit information or the call identifier of user transferred from the called side MSC, associate a call connection of both sides, and perform loop on a voice bearer of both sides; or,
the MSC called processing module is further configured to: transfer the bearer circuit information or call identifier of the calling user to the called side BSS through the terrestrial circuit assignment message;
the BSS called processing module is further configured to: receive the bearer circuit information or the call identifier of user transferred by the calling side MSC, associate the call connection of both sides, and perform loop on the voice bearer of both sides.

11. The system according to claim 10, wherein,
the MSC calling processing module is further configured to: judge whether the calling user satisfies a local switch condition;
the MSC called processing module is further configured to: judge whether the called user satisfies the local switch condition;
wherein, said satisfying the local switch condition refers to a user currently having no conversations of communicating with other users, and complying with a local switch user management policy of operators.

12. The system according to claim 10, wherein, when the calling side MSC and the called side MSC are different, the MSC calling processing module transfers the access information with the called side MSC through an ISUP/BICC signaling or a MAP notification message; or,
the MSC called processing module transfers the access information with the calling side MSC through the ISUP/BICC signaling or the MAP notification message.

13. The system according to claim 10, wherein,
the MSC calling processing module is further configured to: judge whether location information in the access information of the called user and location information on where the calling user is located belong to a same one BSS,
if the location information is judged to belong to the same one BSS and the calling user satisfies a local switch condition, or if the location information is judged to belong to the same one BSS and the access information of the called user includes a support local switch indication of user, and the calling user satisfies the local switch condition, then judge that the local switch can be triggered;
or,
the MSC called processing module is further configured to: judge whether location information in the access information of the calling user and location information on where the called user is located belong to the same one BSS,
if the location information is judged to belong to the same one BSS and the called user satisfies the local switch condition, or if the location information is judged to belong to the same one BSS, the access information of the calling user includes the support local switch indication of user, and the called user satisfies the local switch condition, then judge that the local switch can be triggered.

14. The system according to claim 10, wherein,
the MSC calling processing module is further configured to: send a local switch command to the calling side BSS after receiving a response message of the called user transferred by the called side MSC or the MSC called processing module, wherein the local switch command carries bearer circuit information or a call identifier of the calling user and the called user;
the BSS calling processing module is further configured to: receive the local switch command sent by the calling side MSC, associate a call connection of both sides according to the bearer circuit information or the call identifier of the calling user and the called user which is carried in the local switch command, and perform loop on a voice bearer of both sides;
or,
the MSC called processing module is further configured to: transfer the response message to the MSC calling processing module after receiving the response message of the called user; or send the local switch command to the called side BSS after receiving the response message of the called user; wherein, the local switch command carries the bearer circuit information or call identifier of the calling user and the called user;
the BSS called processing module is further configured to: receive the local switch command sent by the called side MSC, and associate the call connection of both sides according to the bearer circuit information or the call identifier of the calling user and the called user which is carried in the local switch command, and perform loop on the voice bearer of both sides.

15. The system according to claim 10, wherein,
the BSS calling processing module is further configured to: return an implementation result of the local switch to the calling side MSC;
the BSS called processing module is further configured to: return the implementation result of the local switch to the called side MSC;
the MSC calling processing module is further configured to: receive the implementation result returned from the calling side BSS, and forward the implementation result to the MSC called processing module or the called side MSC;
the MSC called processing module is further configured to: receive the implementation result returned from the called side BSS, and forward the implementation result to the MSC calling processing module or the calling side MSC;
wherein, the implementation result includes a local switch completion message or a local switch success message.

16. The system according to claim 10, wherein,
the MSC calling processing module is further configured to: release a bearer terrestrial circuit between the MSC calling processing module and the calling side BSS after receiving an implementation result;
the MSC called processing module is further configured to: release a bearer terrestrial circuit between the MSC called processing module and the called side BSS after receiving the implementation result.

* * * * *